(12) United States Patent
Autumn

(10) Patent No.: US 8,757,097 B1
(45) Date of Patent: Jun. 24, 2014

(54) COMPACT PET SPA

(71) Applicant: Carole Autumn, Fort Worth, TX (US)

(72) Inventor: Carole Autumn, Fort Worth, TX (US)

( * ) Notice: Subject to any disclaimer, the term of this patent is extended or adjusted under 35 U.S.C. 154(b) by 0 days.

(21) Appl. No.: 13/901,436

(22) Filed: May 23, 2013

(51) Int. Cl.
*A61D 11/00* (2006.01)

(52) U.S. Cl.
USPC .......................................... 119/665; 119/674

(58) Field of Classification Search
USPC ......... 119/600, 665, 676, 601, 651, 671, 673, 119/674, 753; 4/656, 564.1, 641, 571.1, 4/659
See application file for complete search history.

(56) References Cited

U.S. PATENT DOCUMENTS

| | | | |
|---|---|---|---|
| 2,438,979 A | 1/1946 | Short | |
| 3,208,432 A * | 9/1965 | Fisk | 119/756 |
| 3,941,092 A | 3/1976 | Winters | |
| 4,020,796 A | 5/1977 | Grifa | |
| 4,057,032 A | 11/1977 | Dimitriadis | |
| 4,083,328 A | 4/1978 | Baker | |
| 4,126,104 A | 11/1978 | Overby | |
| 4,407,234 A | 10/1983 | Kleman | |
| 5,193,487 A | 3/1993 | Vogel | |
| 5,243,931 A | 9/1993 | McDonough | |
| 5,259,339 A | 11/1993 | McLaughlin | |
| 5,279,257 A | 1/1994 | Temby | |
| 5,662,069 A * | 9/1997 | Smith | 119/665 |
| 5,794,570 A | 8/1998 | Foster | |
| 5,974,601 A | 11/1999 | Drane | |
| 6,230,657 B1 * | 5/2001 | Read | 119/502 |
| 6,688,257 B2 | 2/2004 | Lee | |
| 6,935,276 B2 | 8/2005 | Powers | |
| 7,040,254 B1 | 5/2006 | Rucker | |
| 7,044,086 B2 * | 5/2006 | Fisher | 119/843 |
| 7,089,884 B2 * | 8/2006 | Wang et al. | 119/753 |
| 7,198,007 B2 * | 4/2007 | Bestelmeyer | 119/673 |
| 7,219,625 B2 | 5/2007 | Powers | |
| 7,347,165 B2 | 3/2008 | Yoerg | |
| 7,421,978 B2 | 9/2008 | Price | |
| 7,444,958 B2 | 11/2008 | Quinn | |
| 7,503,284 B2 | 3/2009 | Boylan | |
| 7,913,652 B1 * | 3/2011 | Lutz | 119/674 |
| 8,371,248 B2 * | 2/2013 | Redick | 119/671 |
| 8,596,223 B1 * | 12/2013 | Hoelzel et al. | 119/673 |
| 2007/0039559 A1 | 2/2007 | Foster | |
| 2007/0074674 A1 | 4/2007 | Miller | |
| 2007/0079766 A1 | 4/2007 | Park | |
| 2009/0223464 A1 | 9/2009 | Dumenil | |

* cited by examiner

*Primary Examiner* — Yvonne Abbott
(74) *Attorney, Agent, or Firm* — Delphine James

(57) ABSTRACT

The present invention is directed to a light weight pet spa that will consist of an upper section suspended above a lower tub section. Adjustable stabilizing leg members secured and operationally engaged underneath the upper section and within the lower tub section wherein the upper section can be adjusted to support the height of the sues while bathing a pet thereby decreasing the required bending and lifting when bathing a pet in a conventional bath tub.

19 Claims, 7 Drawing Sheets

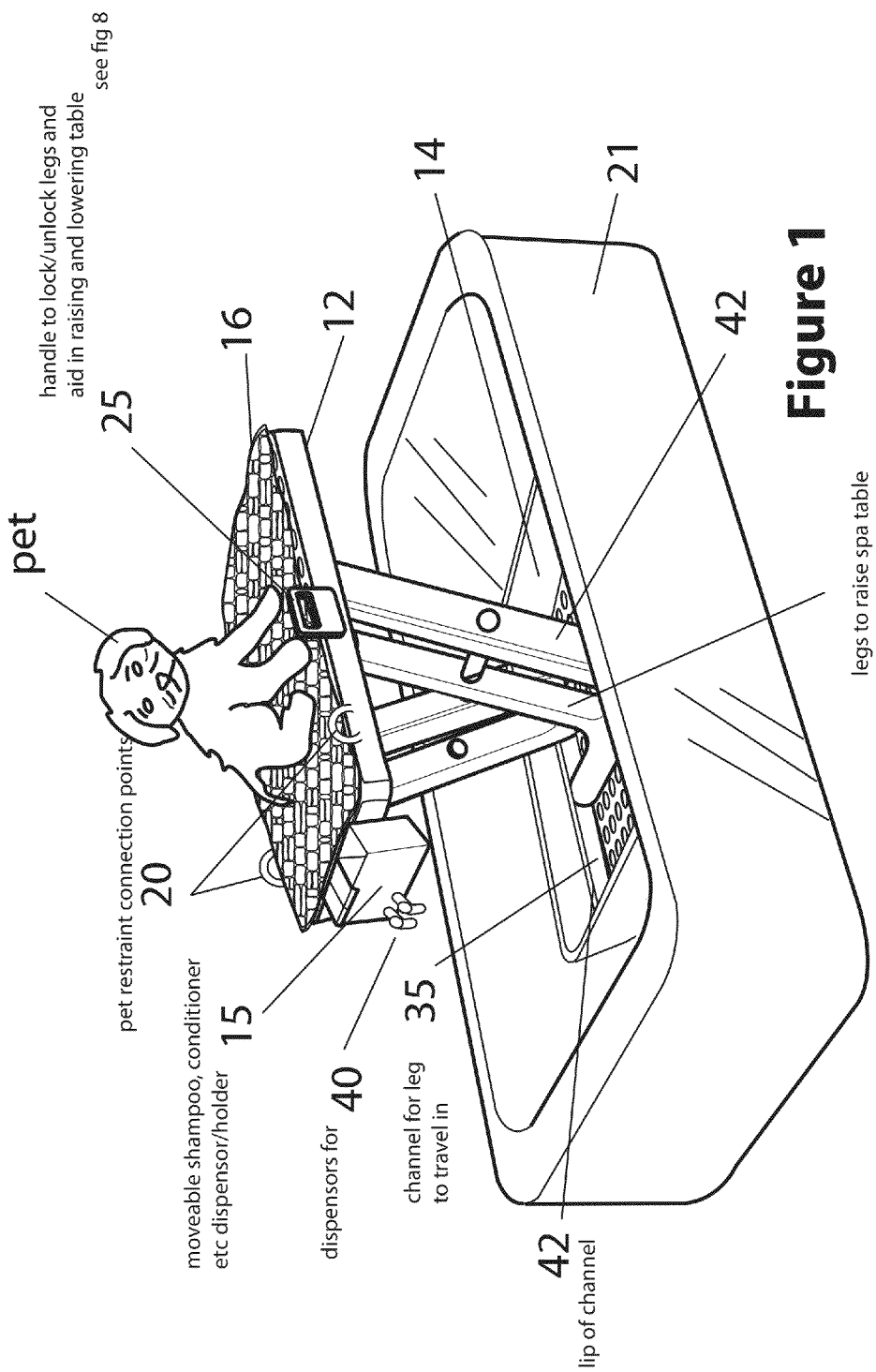

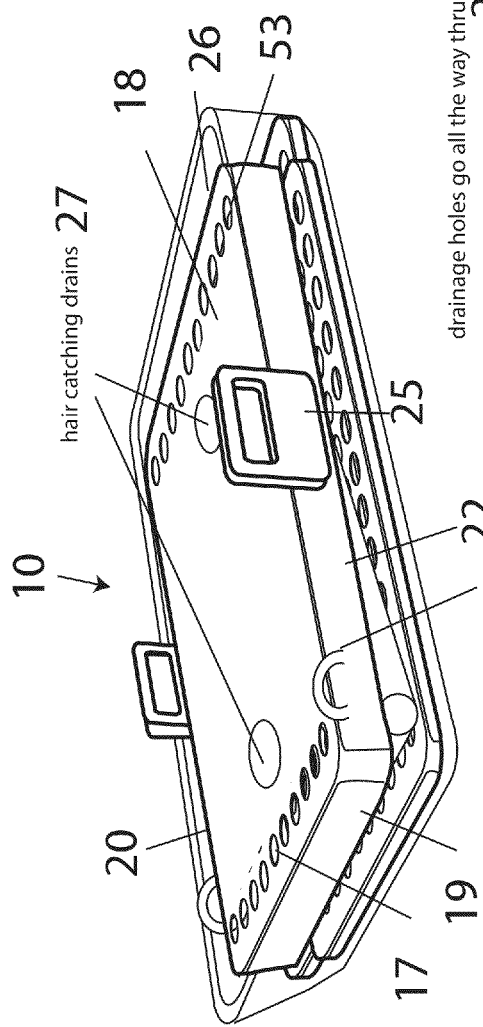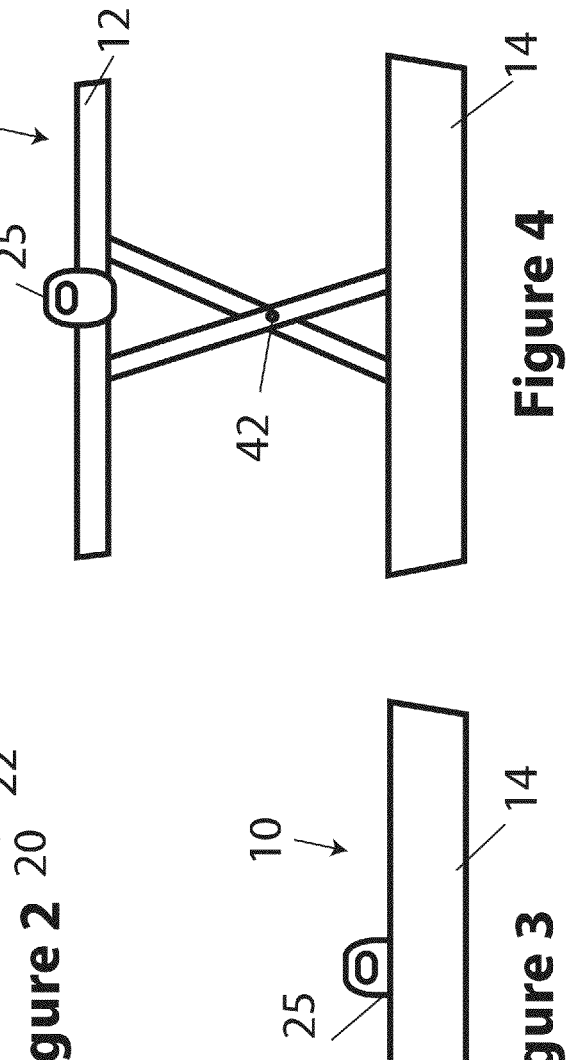

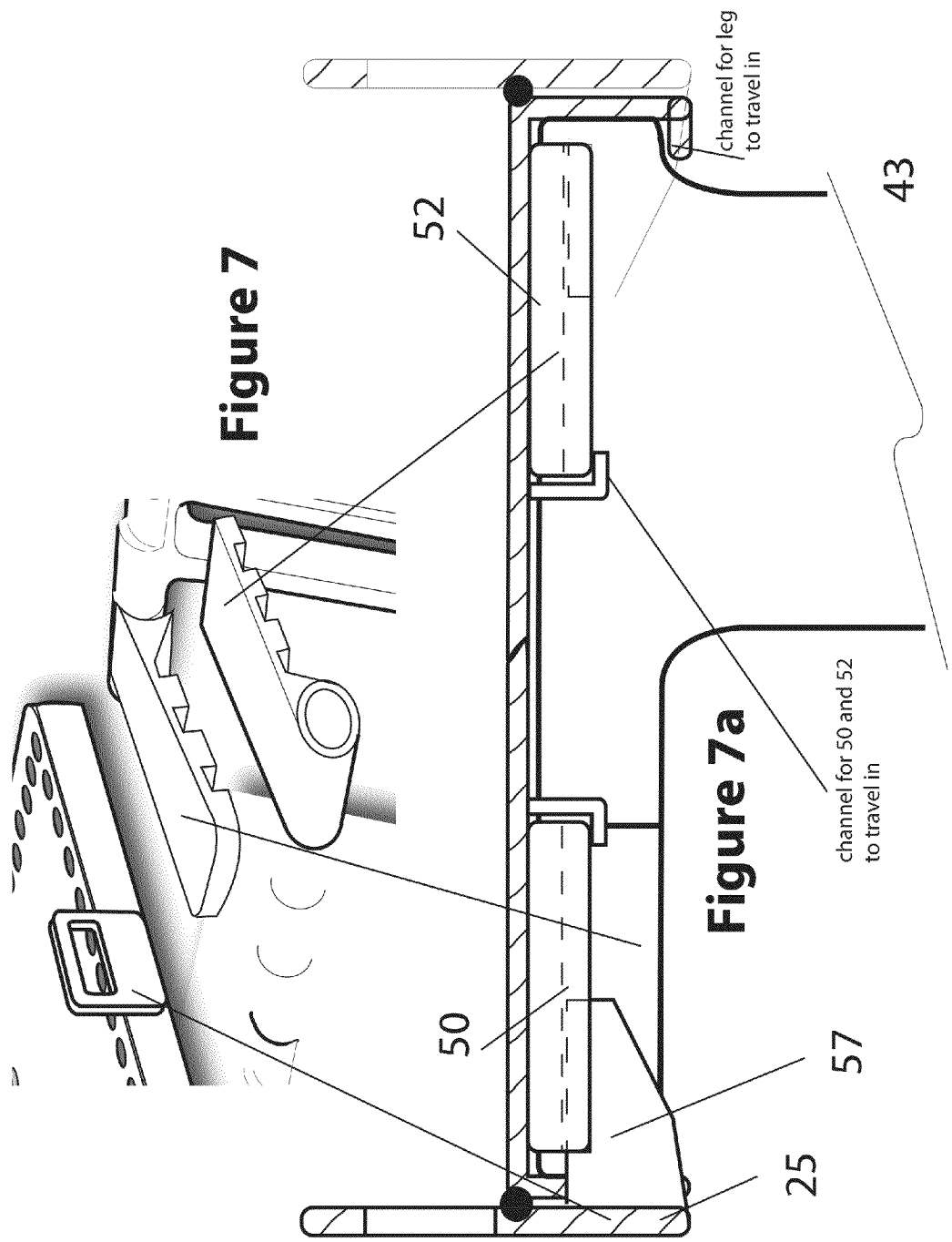

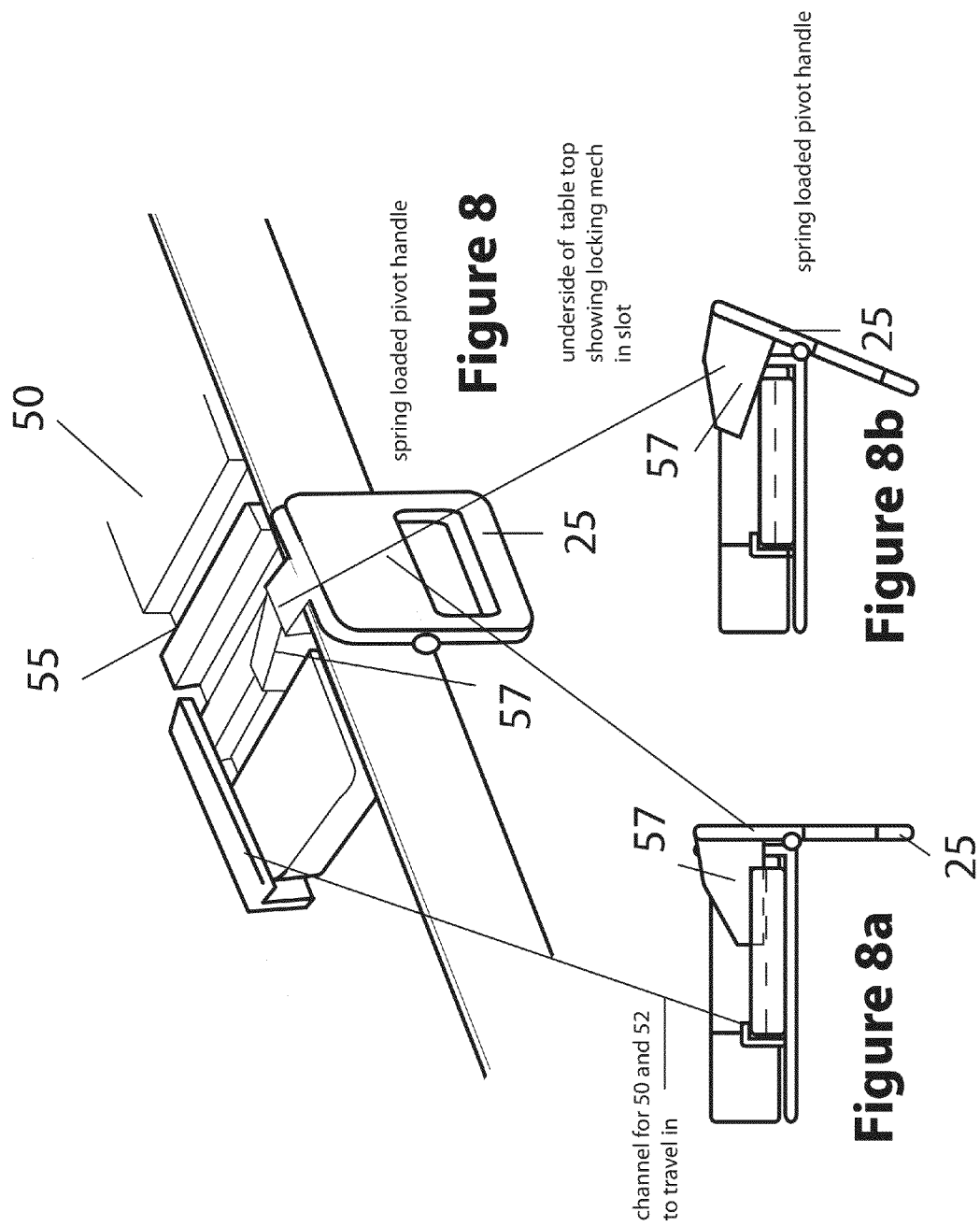

COMPACT PET SPA

NON-PROVISIONAL PATENT

This patent claims the benefit of provisional patent application No. 61/650,944

FIELD OF THE INVENTION

This invention relates to the field of portable apparatus used for the washing and grooming of pets. More specifically this invention relates to a device for efficiently handling the bathing of different pets.

BACKGROUND OF THE INVENTION

All pets in general require periodic bathing and grooming to keep them in good health. Dogs in particular are more difficult because of their often-larger sizes and physical strength. Generally, in the home the pets are washed in a shower, bathtub, and laundry tub or just out on a lawn. This can be an difficult task with a great deal of bending over; kneeling and lifting even with small pets. Often the person doing the bathing gets just as wet as the pet being bathed. Small pets present the difficulty of just holding them in one position to bathe them. Most conventional indoor facilities, i.e. home bathtubs, that can be used for washing pets are often very slippery to stand on, making the job even more difficult and producing more trauma on the pet. Some pets that become very upset when being bathed will often urinate or worse which can increase the problems when the pets are bathed in the house. When pets are washed and groomed, especially in the summer, they are loosing a great deal of hair that can clog drains and cause expensive plumbing problems in the house.

There is a continuing need for improved, inexpensive pet spading and grooming apparatus that comes in a variety of sizes and heights, is convenient and comfortable to use for both the pet and the individual bathing the pet along with being light weight, portable and compact for shipping and storage.

SUMMARY

The principal object of the pet spa of the present invention is to supply an improved portable inexpensive pet spa that will come in a variety of sizes. Another object of the pet spa of the present invention is to supply a device that can be stored and shipped in a relatively small container. Another object of the pet spa is to supply a device that can quickly be easily assembled and disassembled.

Another object of the pet spa is to supply a pet spa that is lightweight and portable either assembled or disassembled.

Another object of the pet spa is to supply a device with stabilizing leg members that can adjust in height. Another object of the pet spa is to provide a tray to allow the pet to be raised to a particular height.

The present invention is directed to a light weight pet spa that will consist of an upper section suspended above a lower tub section. Adjustable stabilizing leg members secured and operationally engaged underneath the upper section and within the lower tub section wherein the upper section can be adjusted to support the height of the sues while bathing a pet thereby decreasing the required bending and lifting when bathing a pet in a conventional bath tub.

BRIEF DESCRIPTION OF THE DRAWINGS

The accompanying drawings, which are incorporated in and form a part of this specification, illustrate embodiments of the invention and together with the description, serve to explain the principles of this invention.

FIG. 1 depicts an opened perspective view of the pet spa.
FIG. 2 depicts a closed perspective view of the pet spa.
FIG. 3 depicts an opened side elevation view of the pet spa.
FIG. 4 depicts a closed elevation view of the pet spa.
FIG. 7 depicts a cut away view of the upper locking mechanism.
FIG. 7a depicts a cross-section view of the top tray
FIG. 8 depicts a cut away view of the handle
FIG. 8a depicts a cross-section view of the handle in a closed position
FIG. 8b depicts a cross-section view of the handle in opened position.

Figure 2A:
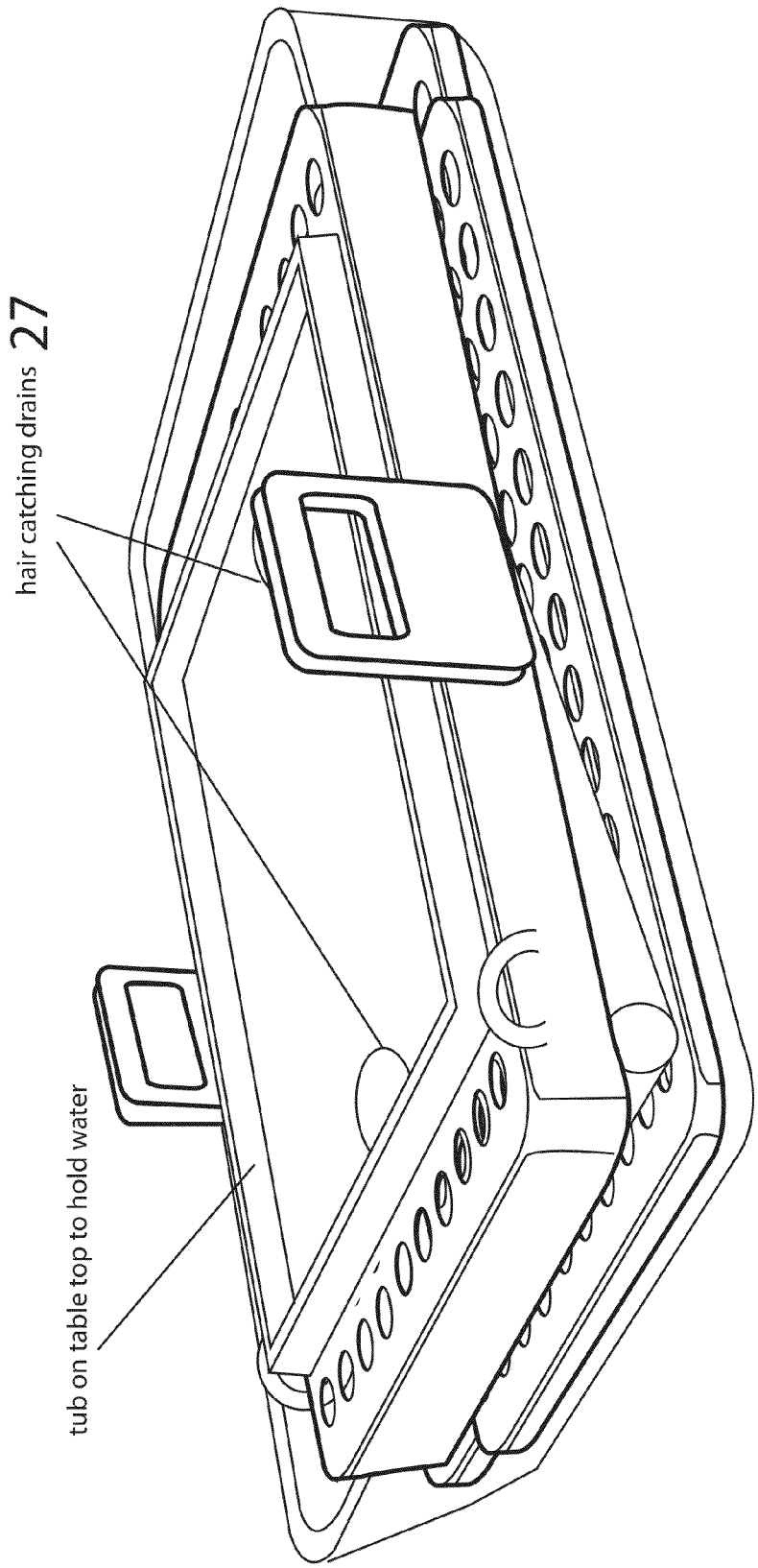
FIG. 2a depicts a tray to hold water.

For a fuller understanding of the nature and objects of the invention, reference should be had to the following detailed description taken in conjunction with the accompanying drawings which are incorporated in and form a part of this specification, illustrate embodiments of the invention and together with the description, serve to explain the principles of this invention.

DETAILED SPECIFICATIONS

Referring now to the drawings, wherein similar parts of the pet spa 10 are identified by like reference numerals, there is seen in FIG. 1 an opened perspective view of the pet spa (10) with the tray top section (12) raised above the tub bottom section (14). Adjustable leg stabilizing members (16) allows the tray top section (12) to be suspended above bottom tub section (14) within a conventional tub (21) as shown in FIG. 1.

As illustrated in FIG. 2 in the preferred embodiment, tray top section (12) has a polygonal shape having a flat base platform section (18) with a side wall circumferentially surrounding the perimeter the base platform section (18). The surrounding sidewall is defined by a top section front wall (19), a top section right side wall (20), a top section left sidewall (22) and a top section back wall (26). As depicted the surrounding side wall extends downward from flat base platform section (18). As shown in the embodiment in FIGS. 1 and 2 drain holes (53) surrounds the outer peripheral edge of the top tray section (12). However, additional drain holes may be located within the mid section of top tray section (12).

Figure 5:
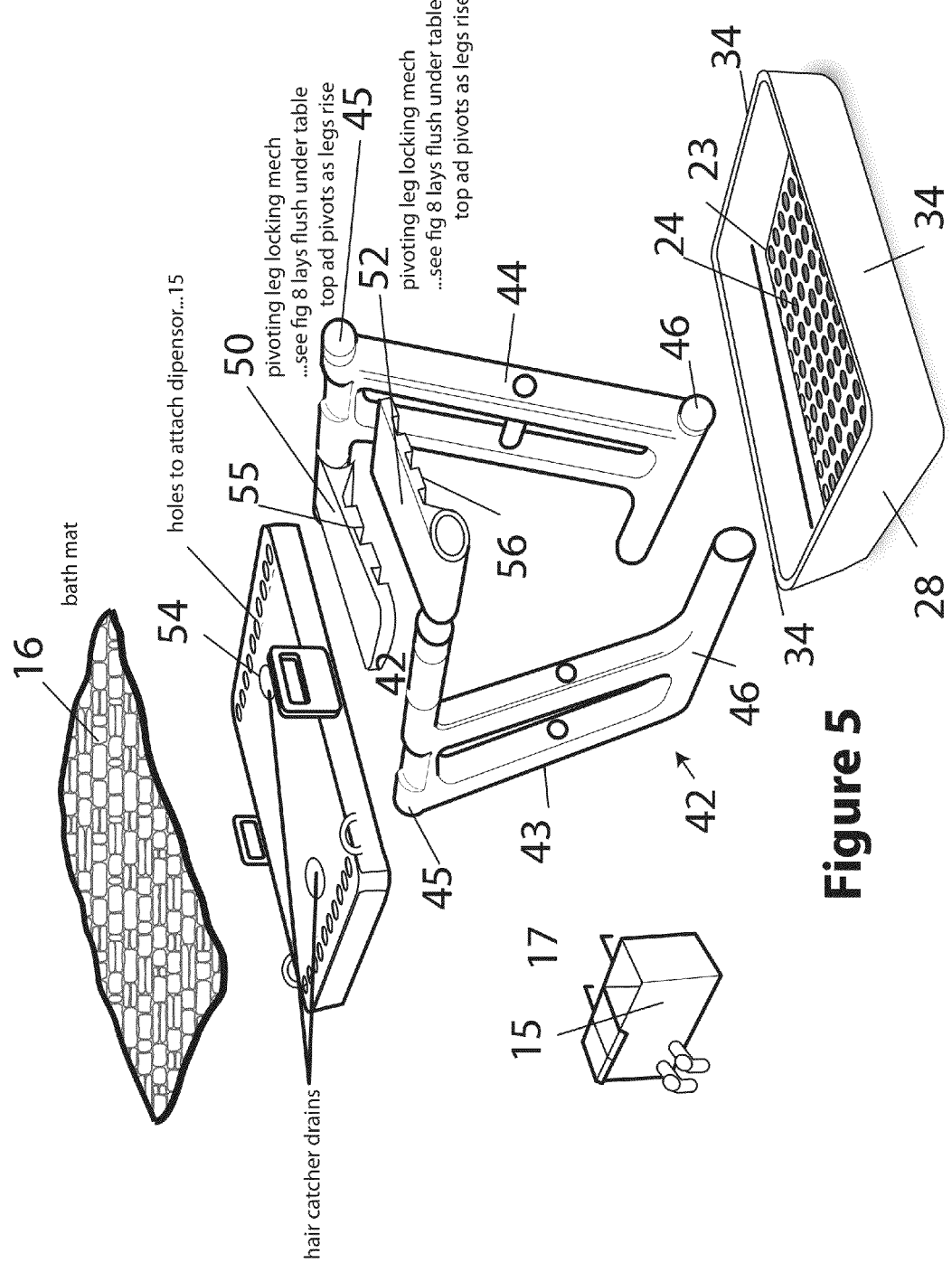
FIG. 5 depicts an exploded opened perspective view of the pet spa.

As illustrated in FIGS. 1 and 5, the present invention further comprises mat (16) which is configured to lay upon topside of top tray section (12). Mat (16) is preferably made of non-skid surface for the pet to stand or lay without slipping as shown in FIG. 1. The Mat (16) top surface can be made of permeable or semi-permeable material such as plastic or another suitable waterproof material. As shown in FIG. 2a the present invention further comprising a top housing that is removable from the top tray section (12). The top housing (101) has a bottom panel with connecting surrounding walls extending upward to a rim and forming a chamber for received a pet therein. The bottom panel (102) can be configured with openings (27) disposed on opposing sides for drainage of water therethrough. Mat (16) in FIG. 5 can be removable placed upon bottom panel (102) within top housing (101) not shown.

As shown in FIGS. 1 and 2, opposing connecting members configured as loop (21) can be used for connection of pet restraints. As depicted in FIGS. 1 and 2, loop 21 are fixably mounted on opposing left (22) and right top side (20) of top tray section (12) for connection with pet restraints (104).

As depicted in FIG. 1, in alternative embodiments a holding container (15) having an opening for receiving a cleansing agent can be removably mounted to the top wall (19) or back wall (26) utilizing fasteners (17) which securely engage within drain holes (53). Dispenser (40) can be operationally mounted to holding container (15) to disperse cleaning agent from the holding container (15).

As shown in FIGS. 1, 7, and 8, handle (25) is mounted upon opposing sides (20,22) of top tray section (12) and can be configured to operationally engage with the actuator (57) operationally coupled to retaining members (50, 52) to provide the capability of raising and lowering the top tray into a suspended position. As illustrated in FIG. 5 in the preferred embodiment, tub bottom section (14) has a polygonal shape having a flat bottom wall (24) with a side wall (34) circumferentially surrounding the perimeter of bottom wall (24) and extending upward therefrom to top edge (35). The surrounding sidewall is defined by a bottom front wall (28), a bottom right side wall 30, a bottom section left sidewall 32 and a bottom back wall (34). As depicted the surrounding side wall (34) extends upward from the flat bottom wall (24) to top edge (35) to form a cavity for receiving top tray (12) therein. Both flat bottom wall (24) and base platform section (18) have the same polygonal shape but base platform (18) has slightly smaller dimensions that allow it to be received within tub section (14). However, the pet spa is not limited to the depicted polygonal shape. The bottom wall (24) has a plurality of drain holes incorporated therein for draining into the convention tub while in use as depicted in FIG. 1.

As illustrated in FIG. 1 in the preferred embodiment, when opened stabilizing adjustable leg members (42) extend upward allowing tray top section 12 to suspend above bottom tub section (14) within in a conventional tub. As depicted in FIG. 2, stabilizing leg members (42) collapses within tub bottom section (14) for easy storage.

Figure 6:
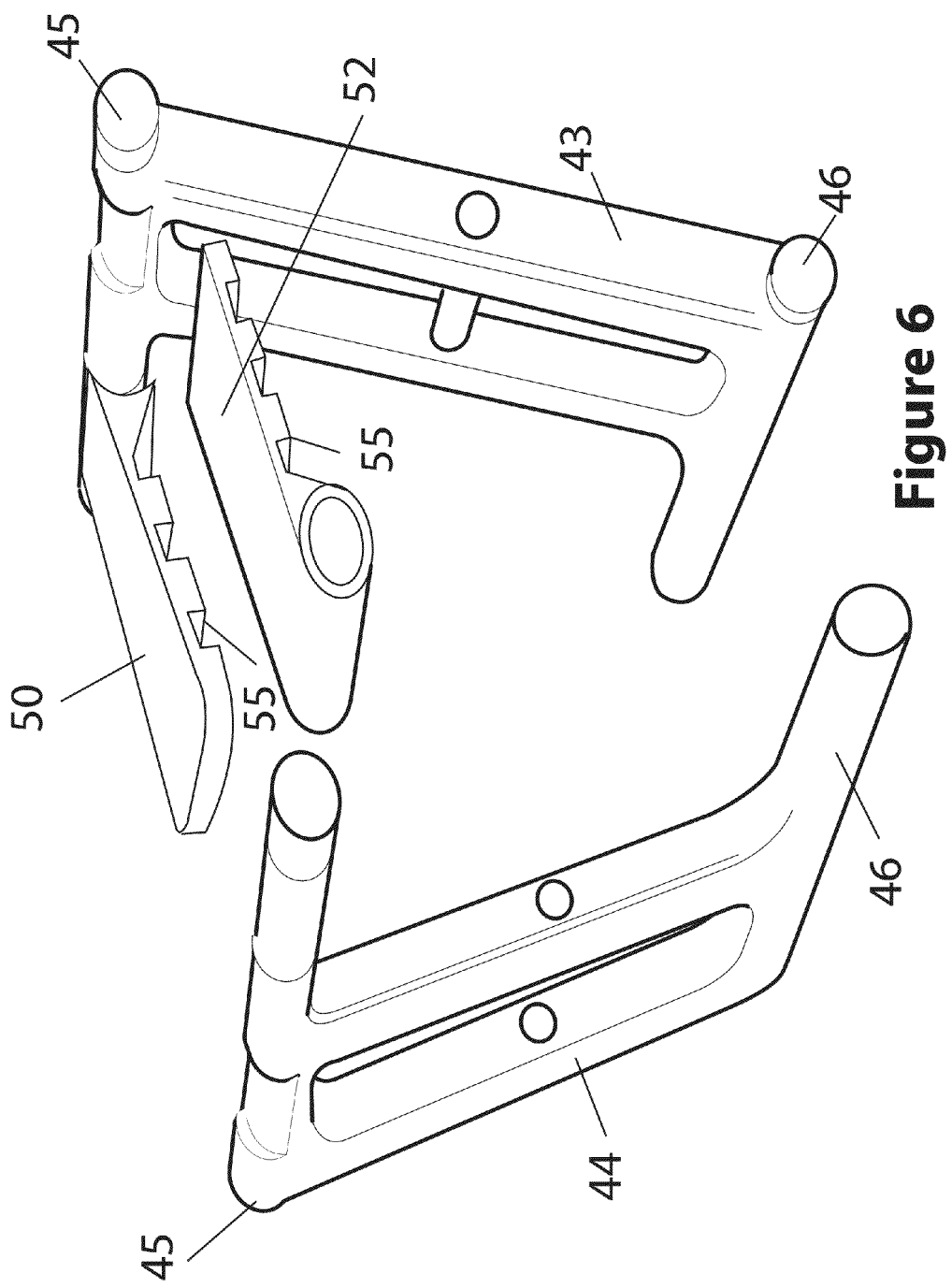
FIG. 6 depicts an exploded perspective view of leg members.

FIG. 3 provides a side view of the top tray (12) collapsed within the bottom tub section (14). FIG. 4 shows a side view of the top tray section (12) suspended above the bottom tub section (14). FIG. 5 shows an exploded view of the pet spa (10). FIG. 6 shows extended view of leg member (43) stabilizing leg member (42) is fabricated with top section (45) and a bottom section (46) supported by an elongated section (44) therebetween. In the depicted embodiment in FIGS. 6, 7, 71, 8, 8a and 8b, the opposing retaining members (50, 52) are operationally engaged underneath top tray section (12). Actuator (57) comprises a locking pin configured to engage within recessed portions (55) disposed within the underside of retaining members (50, 52).

As shown in FIG. 1 the elongated section (44) of each stabilizing leg member (43) is operationally connected in a criss-cross arrangement at mid-section (49). Top section (45) of each stabilizing leg member comprises opposing flap members (50, 52) in a parallel arrangement and hingedly connected thereto. Disposed within the underside of each flap member (50, 52) is a plurality of recessed members (55) which correspond to a desired operational height of the top tray section (12) suspended above the tub section (14). In the depicted embodiment, when handle (25) is pulled upward locking pin (57) is released from a recessed portion (55) within the flap members (50, 52) and leg members (43) can be extended upward or downward to a desired height.

As shown in FIG. 1, opposing receiving channels (36) are disposed within the lower portion of the inner surrounding wall of tub section (14). In use, simultaneously when handle (25) is lifted, the bottom section (46) of leg members (42) is slid inward within receiving channels (36) to adjust the height of leg members (42) upward or slid outward within receiving channels (36) to adjust the height of leg members (42) downward for collapsing as shown in FIG. 2. In other embodiments, leg members can be operationally suspended with other locking mechanisms.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A pet bathing assembly for use within a conventional bathtub comprising:
   a tub having:
      a bottom and a peripheral wall integrally attached to and extending upwardly from the bottom;
      the peripheral wall having an outermost rim with a chamber formed therein;
      a plurality of drain holes disposed within the bottom;
      a plurality of receiving channels incorporated between the bottom and the peripheral wall within the chamber;
   a tray having:
      a flat platform with a perimeter dimensioned to seat within the chamber of the tub;
      a plurality of drain holes disposed thereon;
      a plurality of retaining members disposed underneath the flat platform;
   a plurality of elongated leg members disposed between the top tray and within the chamber of the tub having:
      a top mating portion configured to engage with the plurality of retaining members;
      a bottom mating portion configured to engage with the plurality of receiving channels;
      a central portion cooperatively engaged to an adjacent elongated leg member; and
   opposing actuators disposed on opposing sides of the flat platform of the tray and operationally coupled to the retaining members wherein the elongated leg members can be elevated at adjustable heights to allow the tray to be suspended above the chamber of the tub or collapsed within the chamber of the tub.

2. The pet assembly of claim 1 wherein the tray further comprises a surrounding wall integrally attached to the perimeter of the tray and extending downward therefrom to a peripheral rim.

3. The pet assembly of claim 1 wherein the tray further comprises opposing connecting members attached to opposing sides of the perimeter of the flat platform of the tray wherein opposing pet restraining members can be attached thereto for retaining a pet upon the flat platform of the tray.

4. The pet assembly of claim 1 wherein the tray further opposing handles cooperatively engaged with the opposing actuators and attached to opposing sides of the perimeter of the flat platform of the tray to facilitate the adjusting of the tray to various heights above the chamber of the tub.

5. The pet assembly of claim 4 wherein the opposing handles are disposed adjacent the opposing actuators.

6. The pet assembly of claim 4 wherein the opposing actuators are integrally formed within the opposing handles.

7. The pet assembly of claim 4 wherein the opposing handles are disposed proximate the opposing actuators and cooperatively engaged thereto wherein the opposing handles can be utilized to adjust the height of the tray above the chamber of the tub.

8. The pet assembly of claim 1 wherein the tray further comprises a mat with a perimeter dimensioned to removably fit upon the flat platform.

9. The pet assembly of claim 8 wherein the mat is made of a non-skid material.

10. The pet assembly of claim 9 wherein the container further comprises a dispenser cooperatively engaged with container for allowing the dispensing of the cleansing agent therefrom.

11. The pet assembly of claim 8 wherein the mat is made of a permeable material.

12. The pet assembly of claim 8 wherein the mat is made of a semi-permeable material.

13. The pet assembly of claim 1 further comprising:
   a container with an opening for receiving a cleansing agent therein; and
   at least one fastening member attached to the container for removably attaching to the flat platform of the tray.

14. The pet assembly of claim 1 wherein the elongated leg members further comprises a pair of elongated members cooperatively engaged in a criss-cross arrangement proximately near the central portion thereto.

15. The pet assembly of claim 1 wherein the retaining members further comprises:
   a pair of flat flap members aligned in a parallel arrangement and hingedly connected to the top portion of the elongated leg member at one end;
   a plurality of recessed portions incorporated underneath the pair of flap members;
   the opposing actuators configured to operatively engaged within a recessed portion of the pair of flap members wherein the elongated leg members can be elevated to a desired height above the chamber of the tub.

16. The pet assembly of claim 15 wherein the actuator further comprises a locking pin configured to engage within a recessed portion corresponding to a desired height to raise the tray above the tub.

17. A method of bathing a pet using the pet assembly of claim 1 within a conventional bathtub:
   placing the pet assembly within the conventional baththub;
   placing an underside of the tub within the conventional bathtub;
   activating the opposing actuators wherein the tray can be raised to a desired height above the chamber of the tub;
   placing the pet upon the tray.

18. The method of claim 17 wherein a mat is placed upon a top side of the platform of the tray.

19. The method of claim 17 wherein a pair of pet restraints can be operationally coupled to the opposing sides of the tray wherein the pet can be retained upon the tray.

* * * * *